United States Patent Office 3,592,932
Patented July 13, 1971

3,592,932
N-2-ETHYLHEXYL-N'-ARYL UREAS AS ANTIBACTERIAL AGENTS
Dieter Duerr, Bottmingen, Hans Rudolf Hitz, Muttenz, Max Duennenberger, Frenkendorf, and Max Schellenbaum, Muttenz, Switzerland, assignors to Ciba Limited, Basel, Switzerland
No Drawing. Filed Dec. 28, 1967, Ser. No. 694,121
Claims priority, application Sweden, Jan. 12, 1967, 417/67; Oct. 17, 1967, 14,462/67
Int. Cl. A01n 9/20
U.S. Cl. 424—322                           3 Claims

ABSTRACT OF THE DISCLOSURE

The present invention provides N-2-ethylhexyl-N'-arylureas which are useful as active ingredients in preparations for combating harmful bacteria.

---

The present invention provides preparations for combating harmful bacteria, containing as active ingredient a 2-ethylhexyl-(1)-urea of the formula (1)   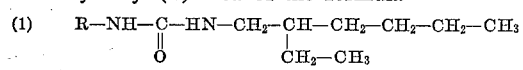

in which R represents a benzene residue which is substituted by a halogen atom or a trifluoromethyl group on at least one carbon atom which is not vicinal to the carbon atom linked with the —NH— group, and this benzene residue contains in p-position to the —NH— group a hydrogen or halogen atom.

Of special value are the 2-ethylhexyl-1-ureas of the formula (2)   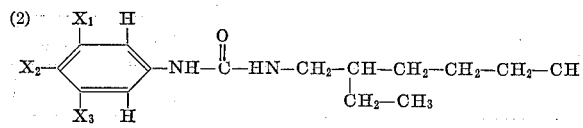

in which $X_1$ and $X_3$, independently of each other, each represents a hydrogen, chlorine or bromine atom or a trifluoromethyl group, $X_2$ represents a hydrogen, chlorine or bromine atom and at least one and at most two of the symbols $X_1$, $X_2$ and $X_3$ are hydrogen atoms.

The N - 3,4 - dichlorophenyl - N' - 2 - ethylhexyl - 1-urea of the formula (3)   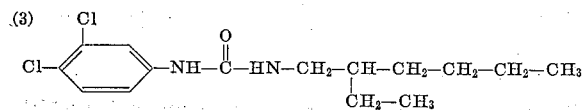

has proved to be particularly potent.

The compounds of the Formula 1 are obtained by reacting an isocyanate of the formula (4)            

where R has the meaning defined above, with 2-ethylhexyl-1-amine.

Preparations for combating harmful bacteria containing a 2-ethylhexyl-1-urea of the Formula 1 may be prepared and used in the known manner. A particularly valuable feature of the new preparations is their broad antibacterial activity spectrum, including both Gram-positive and Gram-negative bacteria. Insofar as the application of the new compounds of the Formula 1 is concerned the absence of odours and colours in them is of special value. Thus, the present invention includes also their use in bacterial control quite generally. They may be used on a very broad basis, especially for protecting organic substrates from infestation by destructive and pathogenic bacteria. The compounds of the Formula 1 are, accordingly, suitable for use as preservatives and disinfectants for textile materials and technical products of all descriptions, in veterinary medicine and in cosmetics.

From among industrial products that can be preserved with the aid of compounds of the Formula 1 there may be mentioned as random examples: textile dressing and improving agents, glues, binders, paints, dyeing and printing paste and similar preparations based on organic or inorganic dyestuffs or pigments, including those which incorporate casein or other organic compounds. Wall and ceiling paints, for example those containing a proteinic dyestuff binder, are likewise protected by an addition of the new compounds from infestation by bacteria.

Furthermore, the compounds of the Formula 1 may be used for preserving and disinfecting dressings on fibres and textile materials; they may be applied both to natural and synthetic fibres and produce on them a durable effect against harmful (including pathogenic) bacteria. The addition may be made before during or after a treatment of the said textile materials with other substances, for example dyeing or painting pastes, dressings or the like.

Textile materials treated in this manner are also protected from the appearance of body odour (perspiration) caused by bacteria.

Compounds of the Formula 1 may also be used as preservatives in the cellulose and paper industries, inter alia for preventing the known slime formation caused by bacteria in paper-making machines.

Furthermore, by combining compounds of the Formula 1 with detergent or surface-active substances there are obtained washing and cleansing preparations having an excellent antibacterial effect. These ureas may be incorporated, for example, with soaps or combined with soap-free detergent and surface-active substances or with mixtures of soaps and soap-free detergents, and in such combinations their antibacterial activity is fully retained.

Cleansing agents containing compounds of the Formula 1 may be used in industry or in the home, also in the food industry, for example in dairies, breweries and abattoirs. The compounds of the Formula 1 may also be used as ingredients of preparations used for cleaning and disinfecting.

Their activity may also be utilized in preserving and disinfecting dressings on plastics. When plasticizers are used it is advantageous to add the compound of the Formula 1 to the plastic material in the form of a solution or dispersion in the plasticizer. It is advantageous to ensure that the compound is distributed as evenly as possible in the plastic. Plastics having antibacterial properties may be used for making utilitarian articles of a wide variety which are desired to have an antibacterial activity, for example in doormats, bathroom curtains, seats, treads in swimming baths and wall coverings. By incorporating them with wax and polishing compositions there are obtained floor and furniture polishes having a disinfecting activity.

The compounds of the Formula 1 may be applied to the textile materials to be protected in various ways, for example by impregnation or spraying with solutions or suspensions containing the said compounds as active ingredient. The content of active substance may range, according to the intended use, from 1 to 30 g. of active substance per litre of treatment liquor. In most cases textile materials of synthetic or natural origin are sufficiently protected from bacterial infestation by a content of 0.1 to 3% of active substance. The active substance may be used in combination with other textile dressings such as finishes, anticrease dressings or the like.

The forms of application may be similar to the usual formulations of pest control agents, for example preparations containing compounds of the Formula 1 may also contain additives such as vehicles, solvents, diluents, dispersants, wetting agents, adhesives and the like, and also other pest control agents, for example fungicidal or fungistatic substances.

Unless otherwise indicated, parts and percentages in the following examples are by weight.

EXAMPLE 1

37.6 parts of 3,4-dichlorophenylisocyanate are added to a solution of 25.9 parts of 2-ethylhexyl-(1)-amine in 200 parts by volume of benzene. The N-3,4-dichlorophenyl-N'-2-ethylhexyl-(1)-urea of the Formula 3 thus formed is precipitated by adding 200 parts by volume of petroleum ether. The yield is about 57 parts (=Compound A).

Calculated for $C_{15}H_{22}ON_2Cl_2$ (percent): N, 8.83; Cl, 22.35. Found (percent): N, 8.70; Cl, 22.64.

In an analogous manner compounds B to H of the following Table I may be prepared:

TABLE I

| Compound | R in formula (1) is | Melting at,°C. |
|---|---|---|
| A | Cl—⟨phenyl⟩— with Cl | 65–66 |
| B | Br—⟨phenyl⟩— with Cl | 75–76 |
| C | Cl—⟨phenyl⟩— with F$_3$C | (1) |
| D | F$_3$C—⟨phenyl⟩— with F$_3$C | 72–73 |
| E | Cl—⟨phenyl⟩— | 64–65 |
| F | Br—⟨phenyl⟩— | 60–61 |
| G | ⟨phenyl⟩— with Cl | 51–52 |
| H | ⟨phenyl⟩— with F$_3$C | 34–36 |

[1] Boiling at 100–105/0.15 mm. Hg.

EXAMPLE 2

Antibacterial activity in the dilution test

A solution of 1% and 0.3% strength each of the active substance in dimethylsulphoxide are introduced into small tubes containing sterile brain heart infusion broth and with these solutions dilution series are prepared in which each member is one tenth the strength of the preceding member. By combining the two series the following continuous dilution series is obtained: 1000, 300, 100, 30, 3 parts per million and so forth.

The solutions are inoculated with the bacterium *Staphylococcus aureus* and then incubated for 48 hours at 37° C. (bacteriostatic test).

After 24 hours' cultivation an earful of the solutions from the tubes is smeared over glucose agar plates and incubated for 24 hours at 37° C. (bactericidal test).

After the times mentioned the minimal inhibitory concentration in parts per million shown in Table II is found.

TABLE II

| | Minimal inhibitory concentration in parts per million | |
|---|---|---|
| Compound: | Bacteriostatic test | Bactericidal test |
| A | 1 | 1 |
| B | 1 | 3.5 |
| C | 1 | 1 |
| D | 0.6 | 1 |
| E | 2 | 3 |
| F | 4 | 5 |

EXAMPLE 3

Specimens of 100 g. of cotton creton are impregnated at 20° C. on a padder with a 0.1% solution of N-3,4-dichlorophenyl-N'-2-ethylhexyl-(1)-urea in isopropanol and then expressed to a weight increase of 100%.

In the same manner specimens of 100 g. of wool cheviot are treated.

The fabrics are dried at 30 to 40° C. and contain 0.1% of active substance referred to their own weight.

To test the bactericidal effect round blanks of the impregnated fabrics of 100 mm. diameter (one half after 24 hours immersion in water at 29° C. and the other without such immersion) are placed on glucose agar plates previously inoculated with *Staphylococcus aureus*. The plates are then incubated for 24 hours at 37° C.

The evaluation of these tests extends to the inhibitory zone (IZ in mm.) around the round blanks and to the growth (G percent) found microscopically underneath the round blanks:

TABLE III

| Substrate (with 0.1% of active substance) | without immersion in water | | With immersion in water | |
|---|---|---|---|---|
| | IZ mm. | G, percent | IZ, mm. | G, percent |
| Cotton | 2 | 0 | 2 | 0 |
| Wool | 1 | 0 | 0 | 0 |

EXAMPLE 4

To manufacture an antibacterial soap in cake form 1.2 g. of N-3,4-dichlorophenyl - N' - 2 - ethylhexyl-(1)-urea are added to a mixture of 120 g. of basic soap in flake form
0.12 g. of the disodium salt of ethylenediamine-tetraacetic acid (dihydrate)
0.24 g. of titanium dioxide.

The soap chips formed by rolling are powdered in a high-speed stirrer and then compressed in cake form.

2.5 grams of the antibacterial soap are dissolved in 50 ml. of tap water and of this solution 1 ml. is added to 4 ml., and 1.5 ml. to 3.5 ml., of glucose broth. By continuous dilution to one tenth the preceding concentration, two series are obtained which by combination form the following continuous dilution series: 100, 30, 10, 3, 1, 0.3, 0.1 etc. parts per million of active substance.

The individual solutions are inoculated with cultures of *Staphylococcus aureus* and incubated for 24 hours at 37° C. After this time an earful of each solution is smeared over glucose agar and the solutions (bacteriostatic test) and the agar plates (bactericidal test) are incubated for 24 hours at 37° C. Then the minimal inhibitory concentration or lethal concentration of the solutions and plates is determined:

Effect against *Staphylococcus aureus*, part per million

Bacteriostatic test (48 hours) _____ 1
Bactericidal test (24 hours) _____ 1

We claim:
1. A composition for combating gram positive bacteria which comprises an effective antibacterial amount of an N-2-ethylhexyl-N'-aryl-urea of the formula

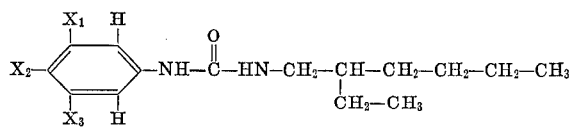

in which $X_1$ and $X_3$, independently of each other, each contains a member selected from the group consisting of hydrogen, chlorine, bromine and trifluoromethyl, $X_2$ represents a member selected from the group consisting of hydrogen, chlorine and bromine with the proviso that at least one and at most two of the symbols $X_1$, $X_2$ and $X_3$ represent hydrogen, and a carrier therefor.

2. A composition according to claim 1 wherein the urea has the formula

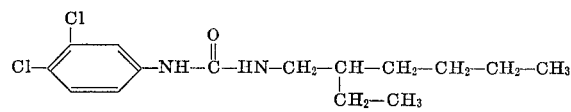

3. A composition according to claim 1 wherein the urea has the formula

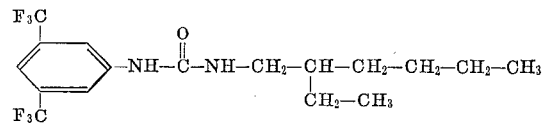

References Cited
UNITED STATES PATENTS

| | | | |
|---|---|---|---|
| 3,072,719 | 1/1963 | Beaver et al. | 424—322 |
| 3,151,023 | 9/1964 | Martin | 424—322 |

ALBERT T. MEYERS, Primary Examiner

V. D. TURNER, Assistant Examiner

U.S. Cl. X.R.

252—107; 260—553